US006817336B2

(12) United States Patent
Glugla et al.

(10) Patent No.: US 6,817,336 B2
(45) Date of Patent: Nov. 16, 2004

(54) INTAKE MANIFOLD PRESSURE CONTROL FOR VARIABLE DISPLACEMENT ENGINES

(75) Inventors: Christopher Paul Glugla, Macomb, MI (US); John Ottavio Michelini, Sterling Heights, MI (US); Michael Flory, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 413 days.

(21) Appl. No.: 10/004,125

(22) Filed: Dec. 6, 2001

(65) Prior Publication Data

US 2003/0106524 A1 Jun. 12, 2003

(51) Int. Cl.[7] .............................................. F00B 77/00
(52) U.S. Cl. ............................. 123/198 F; 123/90.15
(58) Field of Search ................................ 123/436, 481, 123/198 F, 435, 90.15

(56) References Cited

U.S. PATENT DOCUMENTS

| | | | |
|---|---|---|---|
| 4,098,252 A | 7/1978 | Abthoff et al. | |
| 5,209,202 A | 5/1993 | Maurer et al. | |
| 5,337,720 A | 8/1994 | Murakami et al. | |
| 5,362,219 A | 11/1994 | Paul et al. | |
| 5,429,079 A | 7/1995 | Murata et al. | |
| 5,437,253 A | 8/1995 | Huffmaster et al. | |
| 5,654,501 A | 8/1997 | Grizzle et al. | |
| 6,098,592 A | 8/2000 | Hess et al. | |
| 6,237,329 B1 * | 5/2001 | Mizuno | 60/285 |
| 6,250,283 B1 | 6/2001 | Russell et al. | |
| 6,278,933 B1 | 8/2001 | Buckland et al. | |
| 6,466,449 B1 * | 10/2002 | Sheen et al. | 361/752 |
| 6,647,947 B2 * | 11/2003 | Boyer et al. | 123/198 F |
| 6,694,948 B2 * | 2/2004 | Glugla et al. | 123/404 |
| 6,715,289 B2 * | 4/2004 | Mader et al. | 60/612 |
| 6,752,121 B2 * | 6/2004 | Rayl et al. | 123/198 F |

\* cited by examiner

Primary Examiner—John T. Kwon

(57) ABSTRACT

A system and method for controlling a variable displacement internal combustion engine having dedicated actuators associated with a group or bank of cylinders pre-positions actuators associated with the deactivated cylinders based on operating conditions associated with the activated cylinders to reduce torque excursions during reactivation. In one embodiment, a variable cam timing mechanism associated with the deactivated bank of cylinders is pre-positioned to achieve the stead state air charge based on engine speed and manifold pressure of the activated cylinders.

15 Claims, 4 Drawing Sheets

INTAKE MANIFOLD PRESSURE CONTROL FOR VARIABLE DISPLACEMENT ENGINES

BACKGROUND OF THE INVENTION

1. Field of the Invention

The present invention relates to a system and method for controlling a variable displacement engine.

2. Background Art

Fuel economy for a multi-cylinder internal combustion engine can be improved by deactivating some of the engine cylinders under certain operating conditions. Reducing the number of operating cylinders reduces the effective displacement of the engine such that it is sometimes referred to as a variable displacement engine. Depending upon the particular configuration of the variable displacement engine, one or more cylinders may be selectively deactivated to improve fuel economy under light load conditions, for example. In some engine configurations, a group of cylinders, which may be an entire bank of cylinders, is selectively deactivated.

Some variable displacement engines include separate intake manifolds and plenums for each bank of cylinders. When a bank of cylinders is deactivated, the intake manifold pressure approaches the current ambient barometric pressure. When reactivated, the bank of cylinders will produce near maximum torque until the associated manifold pressure is pulled down to a steady state vacuum.

SUMMARY OF THE INVENTION

The present invention pre-positions engine actuators based on engine operating conditions to reduce torque excursions during reactivation of a group or bank of cylinders.

Embodiments of the present invention include a system and method for controlling a variable displacement engine to deliver a desired torque that determine current engine operating conditions and pre-position one or more airflow actuators associated with one or more deactivated cylinders to provide the desired torque assuming those cylinders were activated. In one embodiment, the engine control strategy determines the cylinder air charge to achieve a desired torque based on engine speed, intake manifold pressure, and number of currently activated cylinders. A variable cam timing phase or angle associated with a deactivated cylinder bank is then pre-positioned based on the engine speed, intake manifold pressure, desired torque and number of cylinders to be reactivated.

The present invention provides a number of advantages. For example, the present invention uses pre-position control to reduce the time required to properly position airflow actuators when reactivating cylinders resulting in reduced torque variation or excursions from desired torque.

The above advantage and other advantages, objects, and features of the present invention will be readily apparent from the following detailed description of the preferred embodiments when taken in connection with the accompanying drawings.

DETAILED DESCRIPTION OF THE PREFERRED EMBODIMENT(S)

Figure 1:
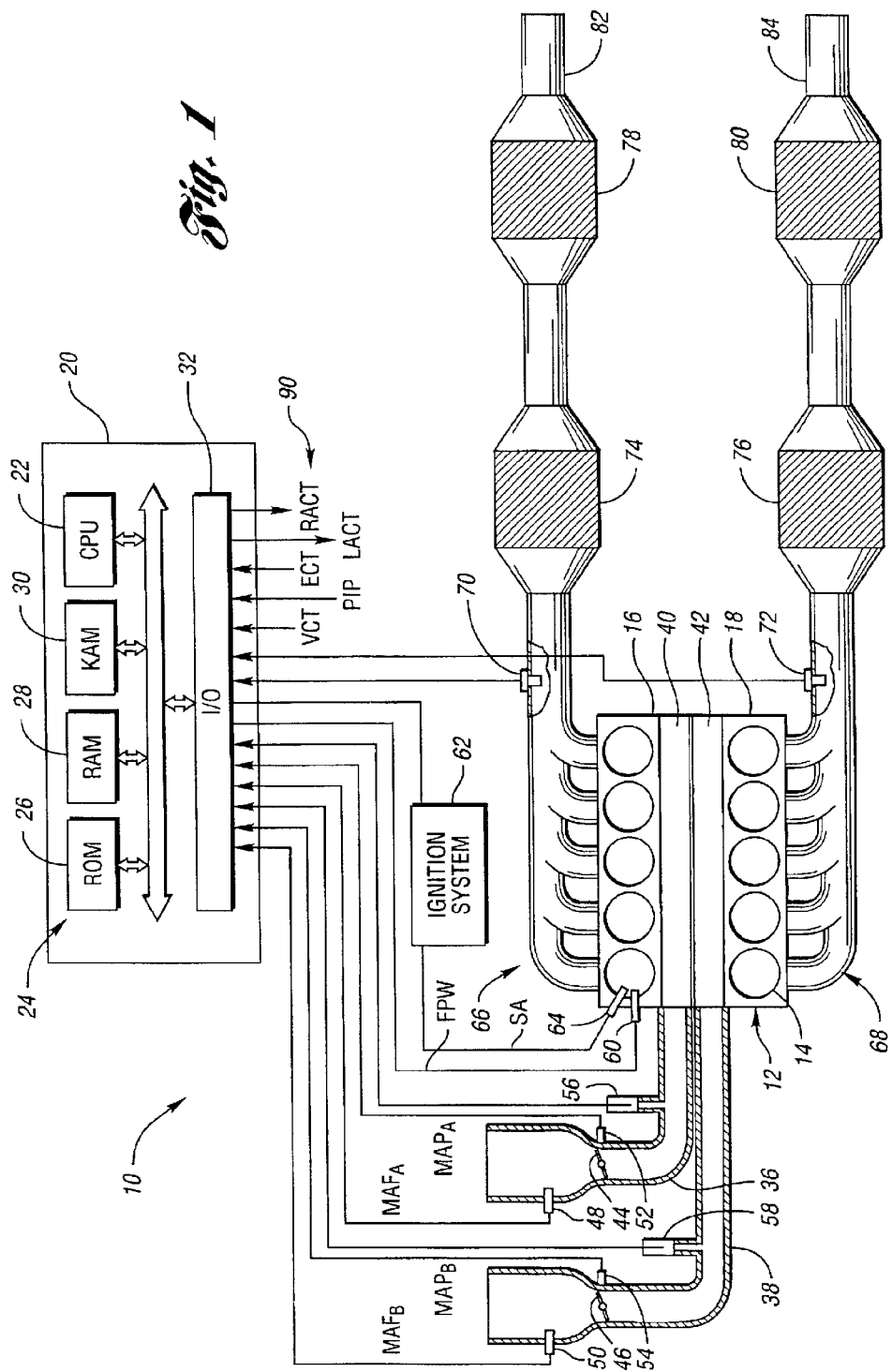
FIG. 1 is a block diagram illustrating operation of one embodiment for a system or method for controlling a variable displacement engine according to the present invention.

A block diagram illustrating an engine control system for a representative internal combustion engine operable in a variable displacement mode according to the present invention is shown in FIG. 1. System 10 preferably includes an internal combustion engine 12 having a plurality of cylinders, represented by cylinder 14. In one preferred embodiment, engine 12 includes ten cylinders arranged in a "V" configuration having two cylinder banks 16, 18 with five cylinders each. As used herein, a cylinder bank refers to a related group of cylinders having one or more common characteristics, such as being located proximate one another or having a common emission control device (ECD), intake manifold, and/or exhaust manifold for example. This would include configurations having a group of cylinders on the same side of the engine treated as a bank even though these cylinders may not share a common intake or exhaust manifold, i.e., the exhaust manifold could be configured with separate exhaust runners or branches if desired or beneficial. Likewise, cylinder banks can also be defined for in-line cylinder configurations which are within the scope of the present invention.

As one of ordinary skill in the art will appreciate, system 10 includes various sensors and actuators to effect control of the engine. One or more sensors or actuators may be provided for each cylinder 14, or a single sensor or actuator may be provided for the engine. For example, each cylinder 14 may include four actuators which operate corresponding intake and exhaust valves, while only including a single engine coolant temperature sensor for the entire engine. However, the block diagrams of the Figures generally illustrate only a single type of sensor for ease of illustration and description.

System 10 preferably includes a controller 20 having a microprocessor 22 in communication with various computer-readable storage media, indicated generally by reference numeral 24. The computer readable storage media preferably include a read-only memory (ROM) 26, a random-access memory (RAM) 28, and a keep-alive memory (KAM) 30. As known by those of ordinary skill in the art, KAM 30 is used to store various operating variables while controller 20 is powered down but is connected to the vehicle battery. Computer-readable storage media 24 may be implemented using any of a number of known memory devices such as PROMs, EPROMs, EEPROMs, flash memory, or any other electric, magnetic, optical, or combination memory device capable of storing data, some of which represent executable instructions, used by microprocessor 22 in controlling the engine. Microprocessor 22 communicates with the various sensors and actuators via an input/output (I/O) interface 32. Of course, the present invention could utilize more than one physical controller, such as controller 20, to provide engine/vehicle control depending upon the particular application.

In the embodiment illustrated in FIG. 1, each bank of cylinders 16, 18 includes an associated dedicated intake manifold 36, 38 and plenum 40, 42. Each cylinder bank 16, 18 preferably includes associated airflow actuators which may include one or more throttle valves 44, 46 and/or intake/exhaust valves for each cylinder 14. The intake/exhaust valves may be actuated using a variable cam timing (VCT) or phasing mechanism as illustrated and described with reference to FIG. 2, for example. Alternatively, electromagnetic valve actuators may be used to provide variable valve timing (VVT) for throttle-less applications, for example. Those of ordinary skill in the art will recognize various other airflow actuators that may be used to control the manifold or cylinder pressure during reactivation of a deactivated cylinder or bank of cylinders according to the present invention.

System 10 preferably includes a mass airflow sensor 48, 50 associated with each intake 36, 38 which provide corresponding signals ($MAF_A$, $MAF_B$) to controller 20 indicative of the mass airflow. If one or both mass airflow sensors is omitted, corresponding mass airflow value(s) may be inferred from various engine operating parameters. Throttle valves 44, 46, which are preferably electronically controlled throttle valves, may be used to modulate the airflow and corresponding intake manifold pressure through intakes 36, 38 during certain operating modes. Throttle valves 44, 46 may be controlled in tandem or independently depending upon the particular application. Alternatively, the present invention may be used in throttle-less applications which may use electronically controlled valves and variable valve timing to modulate intake airflow as described above. Throttle valves 44, 46 are preferably electronically controlled by appropriate actuators 52, 54 based on a corresponding throttle position signal generated by controller 20 with a throttle position sensor providing a feedback signal indicative of the actual position to implement closed loop control.

As illustrated in FIG. 1, manifold absolute pressure sensors 56, 58 may be used to provide a signal (MAP) indicative of the manifold pressures to controller 20. Air passing through intakes 36, 38 enters the combustion chambers or cylinders 14 through appropriate control of one or more intake valves. The intake and exhaust valves may be controlled directly or indirectly by controller 20 along with ignition timing (spark) and fuel to selectively activate/deactivate one or more cylinders 14 to provide variable displacement operation. According to the present invention, one or more airflow actuators associated with a deactivated bank of cylinders are controlled or pre-positioned to reduce or eliminate torque excursions associated with reactivation. In one embodiment, the airflow actuators include a dedicated throttle valve and variable cam timing (VCT) mechanism associated with the deactivated bank of cylinders.

A fuel injector 60 injects an appropriate quantity of fuel in one or more injection events for the current operating mode based on a signal generated by controller 20 processed by an appropriate driver. Control of the fuel injection events is generally based on the position of the pistons within respective cylinders 14. Position information is acquired by an appropriate crankshaft sensor which provides a position signal indicative of crankshaft rotational position. At the appropriate time during the combustion cycle, controller 20 generates a spark signal that is processed by ignition system 62 to control spark plug 64 and initiate combustion within an associated cylinder 14.

Controller 20 (or a camshaft arrangement) controls one or more exhaust valves to exhaust the combusted air/fuel mixture of activated or running cylinders through an associated exhaust manifold, indicated generally by reference numerals 66, 68. Depending upon the particular engine configuration, one or more exhaust manifolds may be used. In one preferred embodiment, engine 12 includes an exhaust manifold 66, 68 associated with each bank of cylinders as illustrated in FIG. 1.

Exhaust gas oxygen sensors 70, 72 are preferably associated with each bank of cylinders and provide a signal indicative of the oxygen content of the exhaust gases to controller 20. As known by those of ordinary skill in the art, the EGO signal may be used as feedback in a closed loop controller to control the air/fuel ratio provided to the one or more cylinders. In one embodiment, heated exhaust gas oxygen sensors (HEGO) are used. The exhaust gas oxygen sensor signals may be used to independently adjust the air/fuel ratio, or control the operating mode of one or more cylinders or banks of cylinders. During operation, the exhaust gas passes through the exhaust manifolds 66, 68 to associated emission control devices (ECDs) 74–80, before exiting the tailpipes 82, 84. While illustrated in a "straight pipe" configuration with each bank having associated ECDs and exhaust tailpipes, the present invention is equally applicable to "Y-pipe" configurations, which combine the exhaust from both banks of cylinders.

Additional sensors/actuators, represented generally by reference numeral 90, may also interface with controller 20 as described in greater detail with reference to FIG. 2.

According to the present invention, controller 20 controls one or more dedicated airflow actuators such as throttle valves 44, 46 and/or variable cam timing mechanisms 200 (FIG. 2) associated with a deactivated bank of cylinders based on current operating conditions associated with the activated cylinders to reduce torque excursions during reactivation. In a preferred embodiment, engine 12 is a V-10 engine with variable displacement operation provided by selectively deactivating one bank of cylinders under appropriate engine and/or vehicle operating conditions, such as light load, for example. The variable cam timing mechanism is pre-positioned based on engine speed and intake manifold pressure of the activated bank of cylinders to be ready for the transition to reactivation faster than scheduling the cam position when a transition is actually desired. The engine speed and intake manifold pressure of the activated bank of cylinders are preferably determined using corresponding sensors. Of course, those of ordinary skill in the art will appreciate that these values may also be calculated or estimated based on one or more other sensors. The present invention determines the cylinder air charge needed on the deactivated bank of cylinders as if the engine were currently running in full cylinder mode, preferably using a lookup table. The invention then calculates the required airflow actuator position(s) to achieve the required cylinder air charge and commands the cam timing mechanism, throttle valve, and/or valve positioning to achieve the required cylinder air charge. When a transition from partial to full cylinder operation is desired, the airflow actuator(s) will be in the desired starting position such that undesirable torque excursions are reduced or eliminated.

Figure 2:
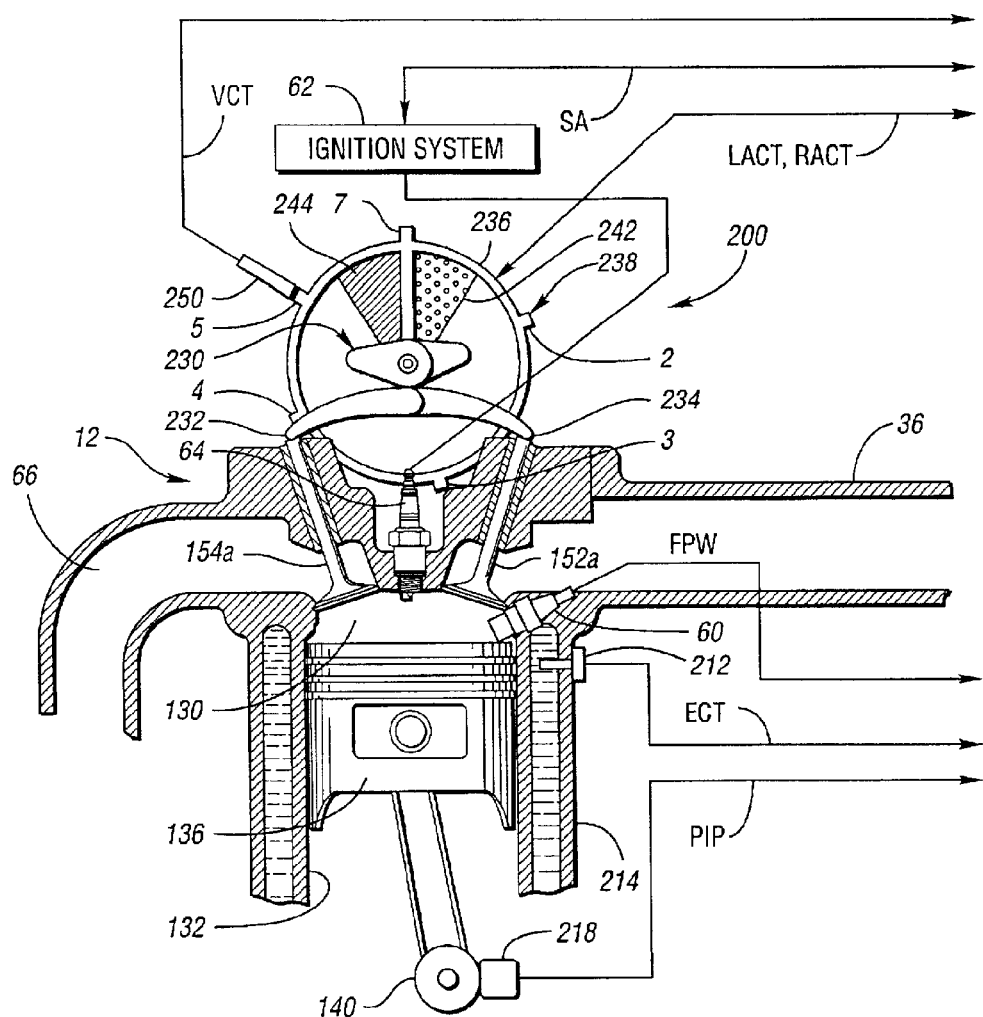
FIG. 2 is a block diagram illustrating one embodiment of a variable cam timing mechanism which may be pre-positioned according to the present invention.

FIG. 2 is a block diagram illustrating a variable cam timing mechanism that may be used for pre-positioning according to the present invention. As illustrated in FIG. 2, the present invention may be used in a direct injection engine or a more conventional port injected engine (not shown). For ease of description and illustration of the representative variable cam timing mechanism, only a single cylinder is illustrated. Of course, for a variable displacement engine having dedicated airflow actuators according to the present invention, independent or integrated variable cam timing mechanisms may be used to independently control the various groups or banks of cylinders that provide variable displacement operation.

The illustrated direct injection spark ignited internal combustion engine includes a plurality of combustion chambers 130 having combustion chamber walls 132 with piston 136 positioned therein and connected to crankshaft 140. Combustion chamber, or cylinder, 130 is shown communicating with intake manifold 36 and exhaust manifold 66 via respective intake valves 152a and 152b (not shown), and exhaust valves 154a and 154b (not shown). Fuel injector 60 is shown directly coupled to combustion chamber 130 for delivering liquid fuel directly therein in proportion to the pulse width of signal fpw received from engine controller 20 (FIG. 1) via a conventional electronic driver. Fuel is delivered to fuel injector 60 by a conventional high-pressure fuel system (not shown) including a fuel tank, fuel pumps, and a fuel rail.

Engine 12 also may determine current operating conditions via signals generated by corresponding sensors, such as an engine coolant temperature sensor 212 coupled to cooling sleeve 214, and a profile ignition pickup signal (PIP) from Hall effect sensor 218 coupled to crankshaft 140. Engine speed signal RPM is generated by controller 20 from signal PIP in a conventional manner. In a preferred aspect of the present invention, sensor 218, which is also used as an engine speed sensor, produces a predetermined number of equally spaced pulses every revolution of the crankshaft.

Continuing with FIG. 2, a representative variable cam timing (VCT) mechanism, indicated generally by reference numeral 200, is shown. VCT mechanism 200 cooperates with camshaft 230, which is shown communicating with rocker arms 232 and 234 for variably actuating intake valves 152a, 152b and exhaust valves 154a, 154b. Camshaft 230 is directly coupled to housing 236. Housing 236 forms a toothed wheel having a plurality of teeth 238. Housing 236 is hydraulically coupled to an inner shaft (not shown), which is in turn directly linked to camshaft 230 via a timing chain (not shown). Therefore, housing 236 and camshaft 230 rotate at a speed substantially equivalent to the inner camshaft. The inner camshaft rotates at a constant speed ratio to crankshaft 140. However, by manipulation of the hydraulic coupling as described herein, the relative position of camshaft 230 to crankshaft 140 can be varied by hydraulic pressures in advance chamber 242 and retard chamber 244. By allowing high-pressure hydraulic fluid to enter advance chamber 242, the relative relationship between camshaft 230 and crankshaft 140 is advanced. Thus, intake valves 152a, 152b and exhaust valves 154a, 154b open and close at a time earlier than normal relative to crankshaft 140. Similarly, by allowing high-pressure hydraulic fluid to enter retard chamber 244, the relative relationship between camshaft 230 and crankshaft 140 is retarded. Thus, intake valves 152a, 152b and exhaust valves 154a, 154b open and close at a time later than normal relative to crankshaft 140.

Teeth 238, being coupled to housing 236 and camshaft 230, allow for measurement of relative cam position via cam timing sensor 250, which provides signal VCT to controller 20 (FIG. 1). Teeth 1, 2, 3, and 4 are preferably used for measurement of cam timing and are equally spaced (for example, in a V-8 dual bank engine, spaced 90 E apart from one another), while tooth 5 is preferably used for cylinder identification. In addition, controller 20 (FIG. 1) sends control signals (LACT, RACT) to conventional solenoid valves (not shown) to control the flow of hydraulic fluid either into advance chamber 242, retard chamber 244, or neither.

Relative cam timing is measured, in general terms, using the time, or rotation angle between the rising edge of the PIP signal and receiving a signal from one of the plurality of teeth 238 on housing 236 to provide a measure of the relative cam timing. For the particular example of a V-8 engine, with two cylinder banks and a five-toothed wheel, a measure of cam timing for a particular bank is received four times per revolution, with the extra signal used for cylinder identification.

Figure 3:
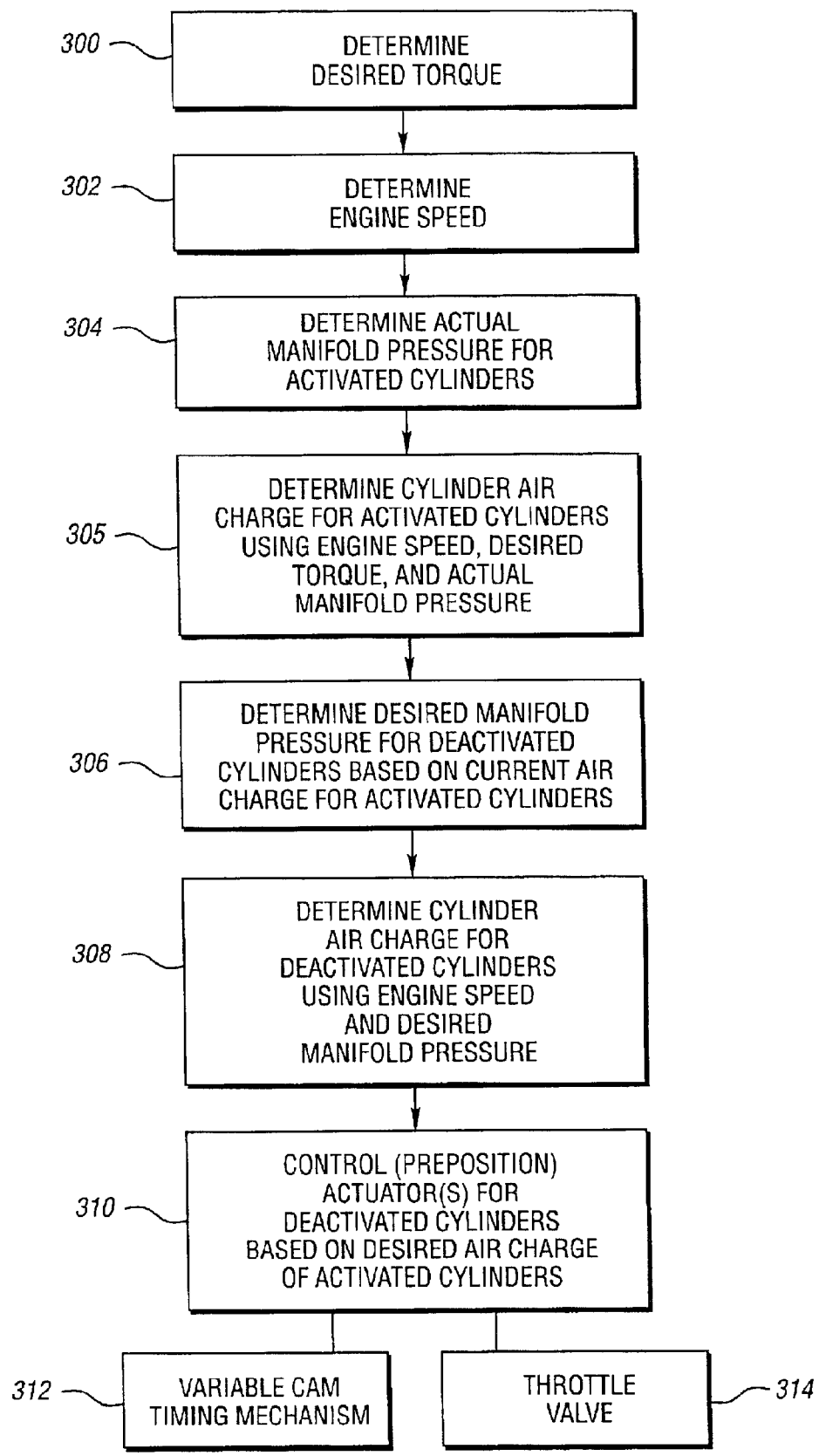
FIG. 3 is a block diagram illustrating operation of one embodiment for a system or method for pre-positioning airflow actuators according to the present invention.

The diagram of FIG. 3 generally represents control logic for one embodiment of a system or method according to the present invention. As will be appreciated by one of ordinary skill in the art, the diagram may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Although not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller. Of course, the control logic may be implemented in software, hardware, or a combination of software and hardware depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

A flow diagram illustrating operation of one embodiment for a system or method for controlling dedicated airflow actuators associated with a deactivated bank of cylinders of a variable displacement engine according to the present invention is shown in FIG. 3. A desired torque is determined as represented by block 300. The desired torque may be determined based on current ambient and/or engine operating parameters, such as accelerator pedal position, barometric pressure, engine speed and/or vehicle speed, for example. During operation in the variable displacement mode, a subset of cylinders, preferably an entire bank, is deactivated and does not contribute to the output torque. As such, the desired torque must be delivered by the currently activated cylinders via appropriate control of the actuators, including the throttle valve, variable cam timing mechanism, ignition, and fueling, for example.

In one embodiment, a current air charge is determined to deliver the desired torque using the activated cylinders based on the engine speed and manifold pressure associated with the activated cylinders as represented by blocks 302 and 304, respectively. The engine speed and manifold pressure may be determined by corresponding sensors or estimated, as described above. The current engine operating point (typically determined based on engine speed and load) can then be used to access a lookup table or calculation to determine the desired manifold pressure associated with the deactivated cylinders and associated actuator positioning as if the engine were using all cylinders, i.e., as if the deactivated cylinders were reactivated, with the actuators being pre-positioned in anticipation of reactivation.

A desired manifold pressure associated with the deactivated cylinders is determined as represented by block 306. The desired manifold pressure may be determined using one or more lookup tables, functions and/or calculations alone or in combination based on the engine operating point or its components (engine speed and load), for example. A corresponding desired air charge for the deactivated cylinders is then determined using the engine speed and the desired manifold pressure for the deactivated cylinders upon reactivation as represented by block 308. One or more actuators associated with the deactivated cylinders are then controlled or pre-positioned based on the operating conditions of the activated cylinders as represented by block 310, and illustrated in FIG. 4. The actuators may include a variable cam timing mechanism as represented by block 312, for which a representative embodiment 110 was illustrated and described with reference to FIG. 2. The actuators may also include a throttle valve as represented by block 314, such as the electronically controlled throttle valves 44, 46 illustrated and described with reference to FIG. 1, for example. In one embodiment, a third-order polynomial expression of air charge is used to determine a desired cam angle with the coefficients of the polynomial stored in a plurality of lookup tables indexed by manifold pressure (MAP) and engine speed. The air charge values are determined from the airflow per cylinder that would be required to produce the current desired torque if the engine was operating on all cylinders. A representative polynomial expression is given by:

$$\text{Cam\_angle} = C_0 + C_1 * \text{air\_charge} + C_2 * \text{air\_charge}^2 + C_3 * \text{air\_charge}^3$$

where the coefficients $C_0$, $C_1$, $C_2$, and $C_3$ are stored in lookup tables indexed by engine speed and MAP.

Figure 4:
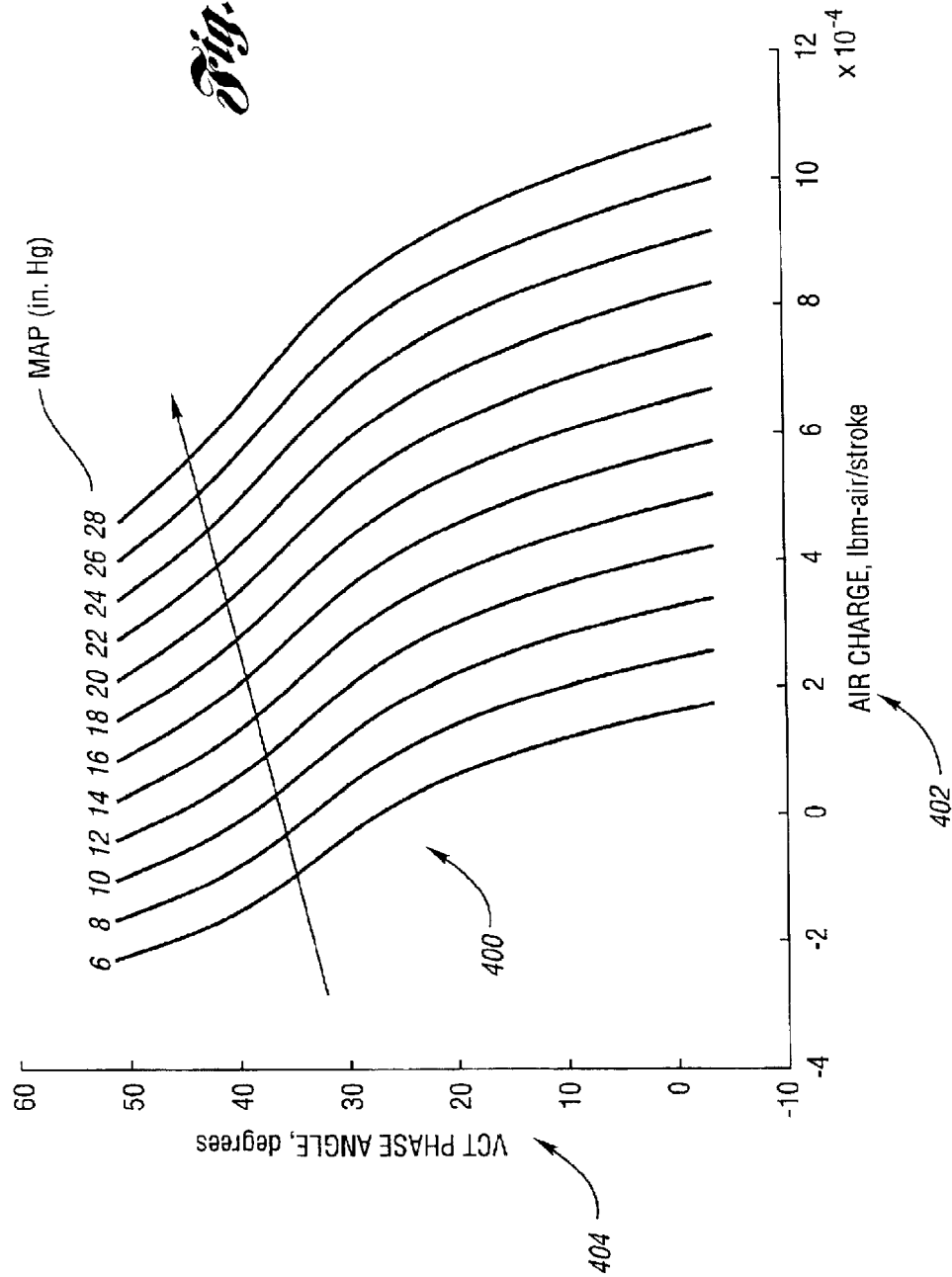
FIG. 4 provides a graphical representation of the relationship between variable cam timing phase angle, air charge, and MAP according to one embodiment of the present invention.

FIG. 4 provides a graphical representation of the relationship between variable cam timing phase angle, air charge, and MAP according to one embodiment of the present invention. As illustrated in FIG. 4, a family of curves 400 representing lines of constant MAP (from about 6 in. Hg to about 28 in. Hg) illustrate the relationship between air charge 402 (determined using current engine speed) and an engine actuator, with the actuator position generally represented by VCT phase angle 404. Of course, other actuators may also be pre-positioned according to the present invention, such as a dedicated throttle valve, for example. Alternatively, the engine speed and intake manifold pressure of the activated cylinders may be used to determine the cylinder air charge needed on the deactivated bank of cylinders using a calculation alone or in combination with one or more lookup tables. The cylinder air charge needed for the deactivated bank of cylinders may then be used to determine the appropriate actuator position using a lookup table indexed by air charge and MAP as illustrated in FIG. 4, for example. The actuator(s) associated with the deactivated cylinders is(are) then pre-positioned to improve response and reduce torque excursions during reactivation. For air charge values that do not intersect a particular MAP curve, a corresponding maximum (or minimum) value for the actuator position may be used. This value may be further adjusted or limited to assure stable combustion with any additional torque adjustments necessary to provide the desired torque provided by spark and/or fuel control. For example, a MAP value of 28 in. Hg has a maximum VCT phase angle of about 50 degrees, which corresponds to an air charge value of about 5. As such, for any air charge values of less than 5, a maximum VCT phase angle of about 50 degrees is used. This value may be adjusted based on the current operating conditions to assure stable combustion. Additional torque adjustments are then provided by fuel and/or spark control as necessary to provide the current desired torque.

As such, in the embodiment of the present invention described above, the electronic engine control strategy determines the cylinder air charge needed for the deactivated bank of cylinders as if the engine were currently running in full cylinder mode. The control strategy then calculates the required variable cam timing based on engine speed and desired manifold pressure to achieve the required cylinder air charge. The controller then commands the cam to the corresponding position. The control system continues to evaluate and command the cam position based on current engine operation conditions. In the event of a transition from partial to full cylinder operation is desired, the camshaft will be in the proper starting position. As such output torque variation is reduced to provide better driveability during reactivation.

By proper pre-positioning of variable cam timing associated with a deactivated bank of cylinders, the present invention reduces the time required to pull down the associated intake manifold pressure from ambient barometric pressure such that any excess torque is reduced or eliminated and driveability is improved.

While the best mode for carrying out the invention has been described in detail, those familiar with the art to which this invention relates will recognize various alternative designs and embodiments for practicing the invention as defined by the following claims.

What is claimed:

1. A method for controlling an internal combustion engine having a plurality of cylinders, at least some of which are selectively deactivated in a variable displacement operating mode, and at least one actuator associated with the selectively deactivated cylinders, the method comprising:
    deactivating at least some of the plurality of cylinders; and
    controlling the at least one actuator while the cylinders are deactivated based on operating conditions associated with the activated cylinders to reduce torque excursions associated with reactivation of the deactivated cylinders.

2. The method of claim 1 wherein the at least one actuator includes a variable cam timing device and wherein the step of controlling comprises pre-positioning the variable cam timing device based on engine speed and manifold pressure associated with the activated cylinders.

3. The method of claim 1 further comprising:
    determining engine speed;
    determining pressure associated with the activated cylinders; and
    wherein the step of controlling includes controlling at least one valve actuator to achieve a desired cylinder air charge in the deactivated cylinders.

4. The method of claim 1 wherein the step of controlling comprises positioning a throttle valve associated with the deactivated cylinders based on a desired cylinder air charge.

5. The method of claim 1 further comprising:
    determining engine speed;
    determining manifold pressure associated with the activated cylinders;
    determining a desired cylinder air charge; and
    wherein the step of controlling includes controlling a variable cam timing device based on the engine speed and the manifold pressure to provide the desired cylinder air charge in the deactivated cylinders upon reactivation.

6. A method for controlling a variable displacement internal combustion engine having at least two banks of cylinders, each bank having an associated dedicated intake manifold, plenum, and variable cam timing mechanism, the method comprising:
 determining a desired torque;
 determining engine speed;
 determining a cylinder air charge based on the desired torque, the engine speed, and the number of activated cylinders; and
 controlling the variable cam timing mechanism associated with deactivated cylinders based on the cylinder air charge and operation of all cylinders prior to reactivation of the deactivated cylinders.

7. The method of claim 6 wherein the engine includes a dedicated throttle valve associated with each bank of cylinders, the method further comprising:
 controlling the throttle valve associated with deactivated cylinders based on the cylinder air charge and operation of all cylinders prior to reactivation of the deactivated cylinders.

8. A system for controlling an internal combustion engine having a plurality of cylinders, at least some of which are selectively deactivated in a variable displacement operating mode, the system comprising:
 at least one actuator for modifying pressure associated with the selectively deactivated cylinders during reactivation, and
 a controller in communication with the at least one actuator for positioning the at least one actuator while the cylinders are deactivated based on operating conditions associated with the activated cylinders to reduce torque excursions associated with reactivation of the deactivated cylinders.

9. The system of claim 8 wherein the at least one actuator comprises a variable cam timing device and wherein the controller pre-positions the variable cam timing device based on engine speed and manifold pressure associated with the activated cylinders.

10. The system of claim 8 further comprising:
 an engine speed sensor; and
 means for determining pressure associated with the activated cylinders;
 wherein the controller generates signals to control at least one valve actuator to achieve a desired cylinder air charge in the deactivated cylinders.

11. The system of claim 8 further comprising:
 a dedicated electronically controlled throttle valve associated with the deactivated cylinders and in communication with the controller, wherein the controller positions the throttle valve based on a desired cylinder air charge.

12. The system of claim 8 further comprising:
 an engine speed sensor in communication with the controller;
 a manifold pressure sensor associated with the activated cylinders and in communication with the controller; and
 a variable cam timing mechanism for modifying intake and/or exhaust valve timing in response to a command from the controller;
 wherein the controller determines a desired cylinder air charge and controls the variable cam timing mechanism based on the engine speed and the manifold pressure to provide the desired cylinder air charge in the deactivated cylinders upon reactivation.

13. A system for controlling a variable displacement internal combustion engine having at least two banks of cylinders, each bank having an associated dedicated intake manifold, plenum, and variable cam timing mechanism, the system comprising:
 means for determining a desired torque;
 means for determining engine speed;
 means for determining a cylinder air charge based on the desired torque, the engine speed, and the number of activated cylinders; and
 means for controlling the variable can timing mechanism associated with deactivated cylinders based on the cylinder air charge and operation of all cylinders prior to reactivation of the deactivated cylinders.

14. The system of claim 13 wherein the engine includes a dedicated throttle valve associated with each bank of cylinders, the system further comprising:
 means for controlling the throttle valve associated with deactivated cylinders based on the cylinder air charge and operation of all cylinders prior to reactivation of the deactivated cylinders.

15. A system for controlling an internal combustion engine having a plurality of cylinders, at least some of which are selectively deactivated in a variable displacement operating mode, and at least one dedicated actuator associated with the selectively deactivated cylinders, the method comprising:
 means for deactivating at least some of the plurality of cylinders in a variable displacement operating mode; and
 means for controlling pressure of the deactivated cylinders based on operating conditions associated with the activated cylinders to reduce torque excursions associated with reactivation of the deactivated cylinders.

* * * * *